US012085034B2

(12) United States Patent
Anzawa

(10) Patent No.: US 12,085,034 B2
(45) Date of Patent: Sep. 10, 2024

(54) VEHICLE CONTROL DEVICE

(71) Applicant: TOYOTA JIDOSHA KABUSHIKI KAISHA, Toyota (JP)

(72) Inventor: Takumi Anzawa, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/349,329

(22) Filed: Jul. 10, 2023

(65) Prior Publication Data

US 2024/0110528 A1 Apr. 4, 2024

(30) Foreign Application Priority Data

Sep. 29, 2022 (JP) ................................ 2022-156830

(51) Int. Cl.
*F02D 41/08* (2006.01)
*F02D 41/02* (2006.01)
*F02P 5/15* (2006.01)

(52) U.S. Cl.
CPC ........ *F02D 41/0255* (2013.01); *F02P 5/1506* (2013.01)

(58) Field of Classification Search
CPC .. F02D 41/029; F02D 41/0245; F02D 41/024; F02D 41/0255; F02D 41/06; F02D 41/062; F02D 41/064; F02D 41/068; F02P 5/00; F02P 5/005; F02P 5/15; F02P 5/1455; F02P 5/145; F02P 5/045; F02P 5/04
See application file for complete search history.

(56) References Cited

U.S. PATENT DOCUMENTS

2016/0114791 A1 4/2016 Muta et al.
2019/0107070 A1* 4/2019 Ikuta ....................... F02D 41/08
2020/0102874 A1* 4/2020 Kurtz .................. F02D 41/1441

FOREIGN PATENT DOCUMENTS

CN 110985168 A * 4/2020 ........... F01N 13/008
JP 2009079513 A * 4/2009
JP 2010001745 A * 1/2010
JP 2010-221897 A 10/2010
JP 2016-078802 A 5/2016
WO WO-2014057825 A1 * 4/2014 ........... F02D 41/402

OTHER PUBLICATIONS

EP-3263858-A1 English Translation + original document (Year: 2018).*

* cited by examiner

*Primary Examiner* — George C Jin
*Assistant Examiner* — Teuta B Holbrook
(74) *Attorney, Agent, or Firm* — Finnegan, Henderson, Farabow, Garrett and Dunner, LLP

(57) ABSTRACT

The vehicle includes an internal combustion engine provided with a catalyst for exhaust gas purification in an exhaust passage, and an automatic transmission having a parking lock mechanism. The control device executes the warm-up operation switching process for executing the first warm-up operation when the parking lock mechanism is operating, and executes the second warm-up operation in which the rotational fluctuation of the internal combustion engine becomes larger than the first warm-up operation when the parking lock mechanism is not operating.

2 Claims, 2 Drawing Sheets

VEHICLE CONTROL DEVICE

CROSS-REFERENCE TO RELATED APPLICATION

This application claims priority to Japanese Patent Application No. 2022-156830 filed on Sep. 29, 2022, incorporated herein by reference in its entirety.

BACKGROUND

1. Technical Field

The present disclosure relates to a vehicle control device.

2. Description of Related Art

For example, in a control device of a vehicle that is described in Japanese Unexamined Patent Application Publication No. 2016-78802 (JP 2016-78802 A), when there is a warm-up request for an exhaust gas reduction catalyst provided in an exhaust passage of an internal combustion engine, one type of warm-up operation is performed by selecting the one type of warm-up operation out of a plurality of types of warm-up operation.

SUMMARY

When the plurality of types of warm-up operation is performed, the combustion state of the air-fuel mixture may be different for each type of warm-up operation. Here, when the warm-up operation in which the combustion state of the air-fuel mixture is unstable is performed, rotational fluctuation of the internal combustion engine may be large, and thus vehicle vibration due to the rotational fluctuation may increase depending on an operating state of a drive system of the vehicle. When the vehicle vibration increases by performing the warm-up operation in this manner, there is a possibility that, for example, a user of the vehicle may feel uncomfortable.

A vehicle control device that solves the above issue is applied to a vehicle including an internal combustion engine provided with an exhaust gas reduction catalyst in an exhaust passage, and a transmission provided with a parking lock mechanism. The vehicle control device performs a warm-up operation switching process in which in a case where warm-up operation is performed when the parking lock mechanism is operated, first warm-up operation is performed, while in a case where the warm-up operation is performed when the parking lock mechanism is not operated, second warm-up operation in which rotational fluctuation of the internal combustion engine is larger than in the first warm-up operation is performed.

In a case where the rotational fluctuation of the internal combustion engine is large when the parking lock mechanism is operated, vehicle vibration caused by the rotational fluctuation may increase. Therefore, in this configuration, the second warm-up operation in which the rotational fluctuation of the internal combustion engine is large is performed, when the parking lock mechanism is not operated. Thus, it is possible to suppress an increase in the vehicle vibration caused by performing the warm-up operation.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an embodiment of a vehicle control device will be described with reference to FIG. 1 and FIG. 2.

Configuration of the Vehicle

Figure 1:
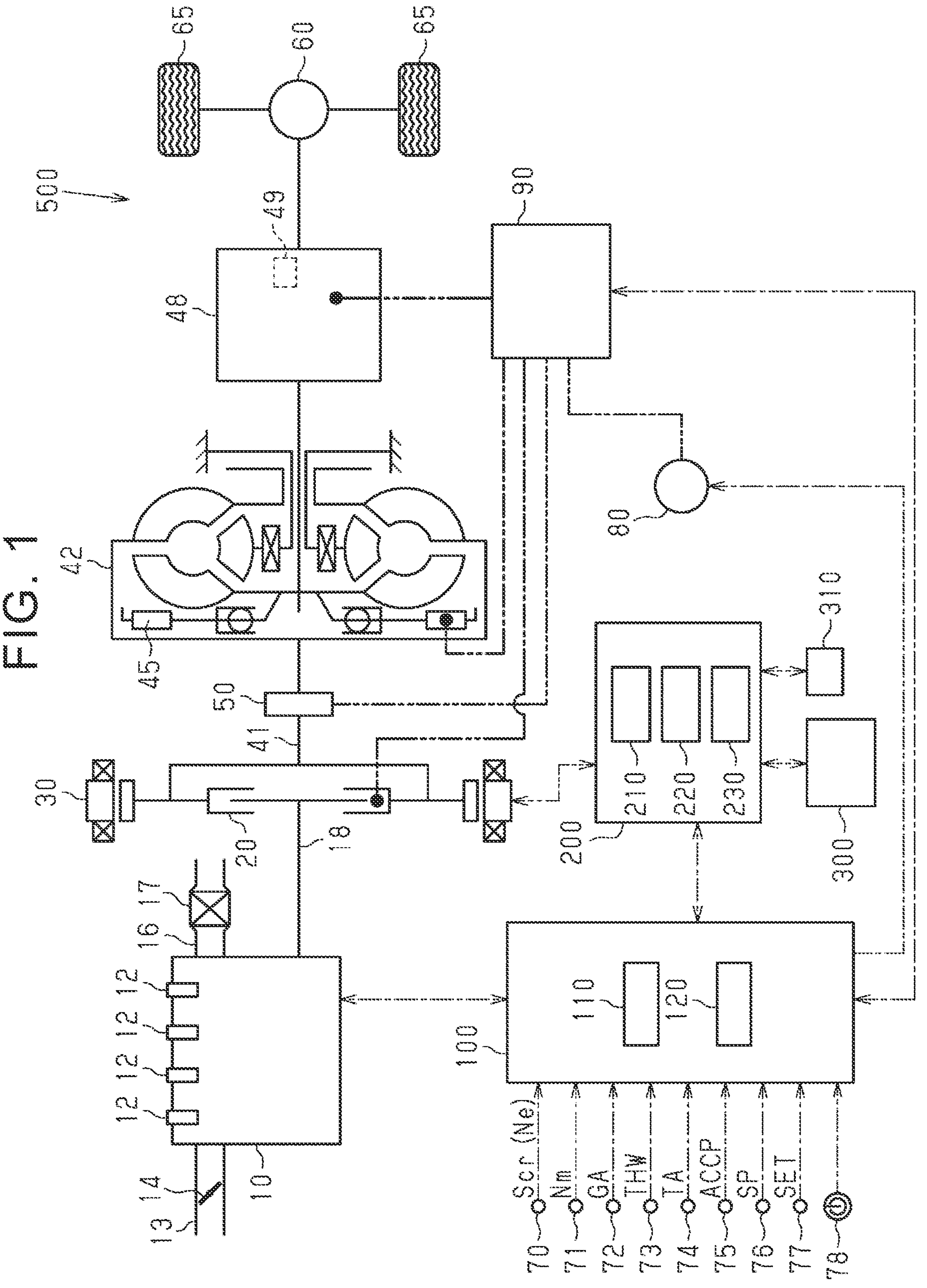
FIG. 1 is a schematic view of a vehicle in one embodiment.

As shown in FIG. 1, the vehicle 500 is a hybrid electric vehicle equipped with two prime movers such as an internal combustion engine 10 and an electric motor 30. The internal combustion engine 10 includes a fuel injection valve 12 that directly injects fuel into a cylinder. The fuel injection valve 12 of the present embodiment is a fuel injection valve for in-cylinder injection that injects fuel directly into a cylinder, but may be a fuel injection valve for port injection that injects fuel into an intake port of an internal combustion engine.

The internal combustion engine 10 includes an intake passage 13. An electric throttle valve 14 for adjusting the intake air amount is provided in the intake passage 13. The internal combustion engine 10 includes an exhaust passage 16. A catalyst 17 for exhaust gas purification is provided in the exhaust passage 16. When the temperature of the catalyst 17 becomes equal to or higher than the activation temperature, the ability to reduce exhaust is increased when the warm-up is completed. In the combustion chamber of the internal combustion engine 10, an engine output is obtained by burning an air-fuel mixture of the air sucked in and the fuel injected from the fuel injection valve 12.

The crankshaft 18 of the internal combustion engine 10 is connected to a hydraulic clutch mechanism 20. An output shaft 41 of the electric motor 30 is connected to the clutch mechanism 20. The clutch mechanism 20 is a mechanism that adjusts a torque transmission amount between the crankshaft 18 and the output shaft 41 of the electric motor 30. When the clutch mechanism 20 is in the engaged state, the crankshaft 18 and the output shaft 41 of the electric motor 30 are connected to each other, while when the clutch mechanism is in the released state, the connection between the crankshaft 18 and the output shaft 41 of the electric motor 30 is released.

The output shaft 41 of the electric motor 30 is provided with a mechanical oil pump 50 driven by the electric motor 30. The vehicle 500 is also provided with an electric oil pump 80. The electric motor 30 exchanges electric power with the high-voltage battery 300 for traveling via Power Control Unit (PCU) 200.

PCU 200 includes a boost converter 210, an inverter 220, a DC-DC converter 230, and the like. The boost converter 210 boosts and outputs the DC voltage input from the high-voltage battery 300. The inverter 220 converts the DC voltage boosted by the boost converter 210 into an AC voltage and outputs the AC voltage to the electric motor 30. DC-DC converters 230 step down the DC voltage of the high-voltage battery 300 to the voltage for driving the auxiliary devices.

Vehicle 500 includes a low-voltage battery 310 that stores the electric power stepped down by DC-DC converters 230. Further, PCU 200 detects the charge rate SOC of the high-voltage battery 300 (SOC=the remaining capacity [Ah]

of the battery/the full charge capacity [Ah]×100%) of the battery and the charge rate SOC of the low-voltage battery 310.

An output shaft 41 of the electric motor 30 is connected to an input shaft of a torque converter 42 having a lock-up clutch 45. An output shaft of the torque converter 42 is connected to an input shaft of the automatic transmission 48. An output shaft of the automatic transmission 48 is connected to the differential gear 60. A drive wheel 65 of the vehicle 500 is connected to an output shaft of the differential gear 60.

The automatic transmission 48 includes a parking lock mechanism 49. The parking lock mechanism 49 is a mechanism that locks the drive wheels 65 so as not to rotate, and operates when the shift lever of the automatic transmission provided in the vehicle cabin of the vehicle 500 is operated to the parking position. The parking lock mechanism 49 includes a parking gear that is spline-fitted to the output shaft of the automatic transmission 48, a parking pole that meshes with the parking gear, and the like. When the shift lever is operated to the parking position, the parking pawl meshes with the parking gear to lock the rotation of the output shaft of the automatic transmission 48. As a result, the drive wheels 65 are locked so as not to rotate. Note that a function of a shift lever may be provided to a button, a touch panel, or the like.

The vehicle 500 includes a mechanical oil pump 50 and a hydraulic pressure adjustment mechanism 90 using the electric oil pump 80 as a hydraulic pressure source. An automatic transmission 48, a lock-up clutch 45, a clutch mechanism 20, and the like are connected to the hydraulic pressure adjustment mechanism 90 as a supply destination of the hydraulic pressure. Then, by controlling the hydraulic pressure supplied from the hydraulic pressure adjustment mechanism 90, the transmission operation by the automatic transmission 48, the operation of the lock-up clutch 45, the operation of the clutch mechanism 20, and the like are controlled.

Various controls such as the ignition timing control of the internal combustion engine 10, the fuel injection control, the control of the electric motor 30, and the control of the hydraulic pressure adjustment mechanism 90 are executed by the control device 100 mounted on the vehicle 500. The control device 100 includes a central processing unit (hereinafter referred to as a CPU) 110 and memory 120 that stores control programs and data. CPU 110 executes the program stored in the memory 120 to execute various kinds of control. Although not shown, the control device 100 includes a plurality of control units such as a control unit for an internal combustion engine and a control unit for a PCU.

A crank angle sensor 70 that detects a rotation angle of the crankshaft 18 and a rotation speed sensor 71 that detects a motor rotation speed Nm that is a rotation speed of the electric motor 30 are connected to the control device 100. The control device 100 is connected with an airflow meter 72 that detects the intake air amount GA of the internal combustion engine 10 and a water temperature sensor 73 that detects a coolant temperature THW that is the temperature of the coolant of the internal combustion engine 10. A throttle sensor 74 that detects a throttle opening degree TA that is an opening degree of the throttle valve 14 and an accelerator position sensor 75 that detects an accelerator operation amount ACCP that is an operation amount of the accelerator pedal are connected to the control device 100. A vehicle speed sensor 76 that detects a vehicle speed SP of the vehicle 500 is connected to the control device 100. Further, the control device 100 is connected with a shift position sensor 77 that detects a shift position SFT that is an operating position of the above-described shift lever. The operating position of the shift lever includes a parking position (P position) and a neutral position (N position) which are non-traveling positions selected when the vehicle 500 is not traveling. Further, the operating position of the shift lever includes a drive position (D position) and a reverse position (R position) which are driving positions selected when the vehicle 500 is driven. Also connected to the control device 100 is a power switch 78 for the driver of the vehicle 500 to start and stop the system of the vehicle 500. The control device 100 recognizes the start request of the system of the vehicle 500 based on the input signal from the power switch 78. The control device 100 calculates the engine rotational speed Ne based on an output signal Scr of the crank angle sensor 70. Further, the control device 100 calculates the engine load factor KL based on the engine rotational speed Ne and the intake air amount GA.

PCU 200 is connected to the control device 100, and the control device 100 controls the electric motor 30 through the control of PCU 200. The control device 100 calculates a vehicle required torque, which is a required value of the driving force of the vehicle 500, from the accelerator operating amount ACCP and the vehicle speed SP. Further, the control device 100 calculates an engine required torque, which is a required value of the output torque of the internal combustion engine 10, and a motor required torque, which is a required value of the power running torque of the electric motor 30, on the basis of the vehicle required torque, the charge rate SOC, and the like. Then, the control device 100 performs output control of the internal combustion engine 10 according to the engine required torque, and performs torque control of the electric motor 30 according to the motor required torque, thereby performing torque control necessary for traveling of the vehicle 500.

When the internal combustion engine 10 is used as the prime mover of the vehicle 500, the control device 100 sets the clutch mechanism 20 in an engaged state and transmits the output torque of the internal combustion engine 10 to the automatic transmission 48. Further, in some cases, the electric motor 30 is also caused to operate in a powered manner to transmit not only the output torque of the internal combustion engine 10 but also the powered torque of the electric motor 30 to the automatic transmission 48. On the other hand, when only the electric motor 30 is used as the prime mover of the vehicle 500, the control device 100 shuts off the torque transmission between the internal combustion engine 10 and the automatic transmission 48 by setting the clutch mechanism 20 to the released state. Then, the electric motor 30 is caused to operate in a powered manner to transmit the powered torque of the electric motor 30 to the automatic transmission 48. In this way, when only the electric motor 30 is used as the prime mover of the vehicle 500, the operation of the internal combustion engine 10 is stopped. Thus, during the operation of the vehicle 500, the intermittent operation in which the operation and the operation stop of the internal combustion engine 10 are repeated is performed.

Warm-Up Operation Switching Process

When the internal combustion engine 10 is started in accordance with the start request of the internal combustion engine 10 and there is a warm-up request for the catalyst 17, the control device 100 executes a warm-up operation for prompting warm-up of the catalyst 17. In the present embodiment, one of the first warm-up operation and the second warm-up operation is selected and executed as the warm-up operation.

The first warm-up operation is an operation in which the temperature of the exhaust gas is increased by retarding the ignition timing from the ignition timing of the internal combustion engine 10 set when there is no warm-up request for the catalyst 17, thereby promoting the temperature rise of the catalyst 17. When the first warm-up operation is performed, homogeneous combustion is performed.

The second warm-up operation is an operation in which the temperature of the exhaust gas is increased more than that in the first warm-up operation and the temperature of the catalyst 17 is rapidly increased by setting the ignition timing to a later timing than in the first warm-up operation. In this second warm-up operation, since the ignition timing is set to a later timing as compared with the first warm-up operation, the combustion state of the air-fuel mixture tends to become unstable. Therefore, the second warm-up operation is an operation mode in which the rotational fluctuation of the internal combustion engine 10 is larger than the first warm-up operation. In order to suppress such destabilization of the combustion state, in the present embodiment, stratified combustion is performed when the second warm-up operation is executed.

Figure 2:
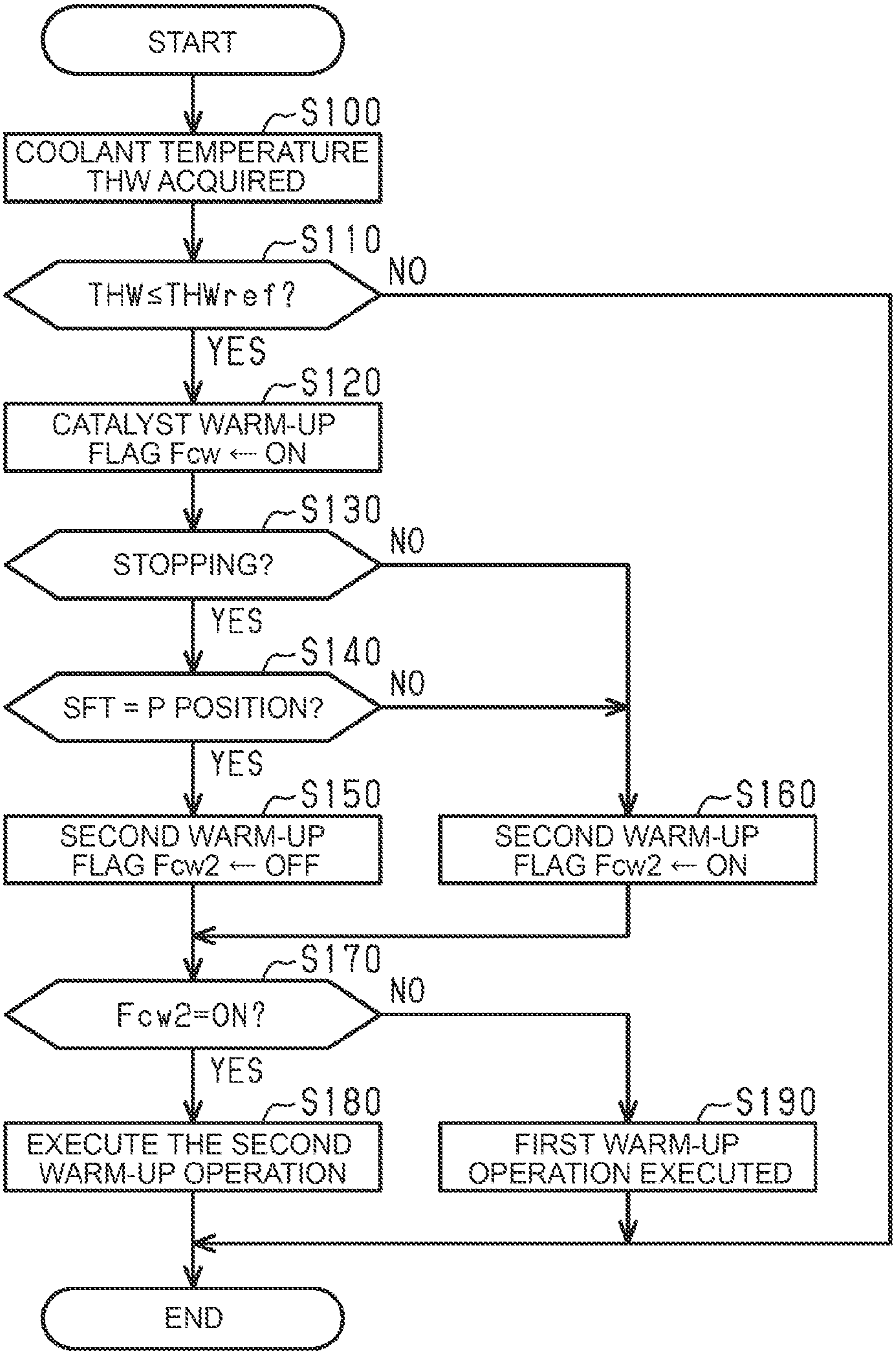
FIG. 2 is a flowchart illustrating a procedure of a warm-up operation switching process executed by the control device according to the embodiment.

FIG. 2 shows the procedure of the warm-up operation switching process performed by selecting one of the first warm-up operation and the second warm-up operation. In the following description, the step number is represented by a number with "S" assigned to the head.

The warm-up operation switching process is a process executed by the control device 100 at the time of starting the internal combustion engine 10 according to a start request of the internal combustion engine 10. Incidentally, as a start request of the internal combustion engine 10, there are an initial start request and an intermittent start request.

The first start request is the first start request after the power switch 78 is turned on. The intermittent start request is a start request by the intermittent operation described above, and an example in which the intermittent start request occurs is, for example, a case in which a vehicle drive torque that cannot be compensated only by the torque of the electric motor 30 is required when the operation of the internal combustion engine 10 is stopped. Examples of the intermittent start request include, for example, a case where a request for charging the high-voltage battery 300 or a case where a request for charging the low-voltage battery 310 is generated.

When the process illustrated in FIG. 2 is started, the control device 100 acquires the coolant temperature THW at the time of starting the engine (S100). Next, the control device 100 determines whether or not the acquired coolant temperature THW is equal to or lower than the threshold THWref (S110). As the threshold THWref, the magnitude of the value is set so that it can be accurately determined that the warm-up operation of the catalyst 17 needs to be performed based on the fact that the coolant temperature THW is equal to or lower than the threshold THWref.

In S110 process, when it is determined that the coolant temperature THW is equal to or lower than the threshold THWref (S110: YES), the control device 100 sets the catalytic warm-up flag Few to "ON" (S120). The catalyst warm-up flag Few is a flag that is set to "ON" when the precondition for executing the warm-up operation of the catalyst 17 is satisfied, that is, when an affirmative determination is made in the above S110 process, and the default is "OFF". When the catalyst warm-up flag Few is "ON", it indicates that there is a warm-up request for the catalyst 17, and when the catalyst warm-up flag Few is "OFF", it indicates that there is no warm-up request for the catalyst 17.

Next, the control device 100 determines whether or not the vehicle 500 is stopped based on the vehicle speed SP or the like (S130).

When it is determined that the vehicle is stopped in S130 process (S130: YES), the control device 100 determines whether or not the present shift position SFT is the parking position, that is, whether or not the parking lock mechanism 49 is activated (S140).

Then, in S140 process, when it is determined that the shift position SFT is the parking position, that is, when it is determined that the parking lock mechanism 49 is operating (S140: YES), the control device 100 sets the second warm-up flag Fcw2 to "OFF". The initialization of the second warm-up flag Fcw2 is "OFF".

On the other hand, when a negative determination is made in S130 process or S140 process, the control device 100 sets the second warm-up flag Fcw2 to "ON" (S160). When S150 process or S160 process is executed, the control device 100 next determines whether or not the second warm-up flag Fcw2 is "ON" (S170).

When S170 process determines that the second warm-up flag Fcw2 is "ON" (S170: YES), the control device 100 executes the above-described second warm-up operation (S180).

On the other hand, in S170 process, when it is determined that the second warm-up flag Fcw2 is not "ON" (S170: NO), that is, when the second warm-up flag Fcw2 is "OFF", the control device 100 executes the above-described first warm-up operation (S190).

When a negative determination is made in S110 process or when S180 process or S190 process is executed, the control device 100 ends the process.

Action and Effect

A description will now be made on action and effects of this embodiment.

(1) When the rotational fluctuation of the internal combustion engine 10 increases while the parking lock mechanism 49 is operating, the vehicle vibration caused by the rotational fluctuation may increase. Therefore, in the present embodiment, as shown in FIG. 2, when it is determined that the shift position SFT is not the parking position (S140: NO), the second warm-up flag Fcw2 is set to "ON" (S160), and the second warm-up operation is executed (S180). Therefore, the second warm-up operation in which the rotational fluctuation of the internal combustion engine 10 increases is executed when the parking lock mechanism 49 is not operated. Therefore, it is possible to suppress an increase in vehicle vibration caused by execution of the warm-up operation.

(2) Since the second warm-up operation is executed when the parking lock mechanism 49 is not activated, the catalyst 17 can be warmed up earlier than when the first warm-up operation is executed.

(3) As shown in FIG. 2, when the shift position SFT is determined to be the parking position in S140 process (S140: YES), the second warm-up flag Fcw2 is set to "OFF" (S150), so as to execute the first warm-up operation (S190). Therefore, when the parking lock mechanism 49 is in operation, the first warm-up operation in which the rotational fluctuation of the internal combustion engine 10 is smaller than the second warm-up operation is executed. Therefore, even if the warm-up operation is performed while the parking lock mechanism 49 is operating, an increase in vehicle vibration due to the execution of the warm-up operation can be suppressed.

(4) Since the increase in the vehicle vibration caused by the execution of the warm-up operation can be suppressed, it is possible to suppress the discomfort that such an increase in the vehicle vibration gives to the vehicle user.

Example of Change

The above-described embodiment can be modified as follows. The above embodiment and modification examples described below may be carried out in combination of each other within a technically consistent range.

The internal combustion engine 10 is provided with a fuel injection valve for injecting fuel directly into a cylinder, but may be provided with a fuel injection valve for injecting fuel into an intake port.

The vehicle 500 may include a manual transmission instead of the automatic transmission 48.

The vehicle 500 may not include the torque converter 42.

Homogeneous combustion was performed when the first warm-up operation was performed and stratified combustion was performed when the second warm-up operation was performed, but such a change in the combustion method is not essential.

The hybrid system of the vehicle 500 is not limited to the one shown in FIG. 1, and may be another hybrid system. For example, a so-called series-parallel hybrid system may be employed in which the clutch mechanism 20 is not provided and the crankshaft 18 and the electric motor 30 are connected via a power split mechanism.

The vehicle 500 is not limited to a vehicle including an internal combustion engine and an electric motor as a prime mover. For example, a vehicle equipped with an internal combustion engine may be a vehicle not equipped with an electric motor.

The control device 100 includes a CPU 110 and memories 120, and is not limited to executing software-processing. For example, it may include dedicated hardware circuitry (e.g., ASIC, etc.) for processing at least a portion of the software processing performed in the above embodiments. That is, the control device 100 may have any of the following configurations (a) to (c). (a) A processing device that executes all of the above-described processing in accordance with a program, and a program storage device such as a memory that stores the program are provided. (b) A processing device and a program storage device for executing a part of the above processing in accordance with a program, and a dedicated hardware circuit for executing the remaining processing are provided. (c) A dedicated hardware circuit that executes all of the above processes. Here, a plurality of software processing circuits including the processing device and the program storage device and dedicated hardware circuits may be provided. That is, the above processing may be performed by a processing circuit including at least one of one or more software processing circuits and one or more dedicated hardware circuits.

What is claimed is:

1. A vehicle control device applied to a vehicle including an internal combustion engine provided with an exhaust gas reduction catalyst in an exhaust passage, and a transmission provided with a parking lock mechanism, wherein the vehicle control device performs a catalyst warm-up operation for promoting warm-up of the catalyst when the internal combustion engine is started and there is a warm-up request for the catalyst, and a catalyst warm-up operation switching process in which in a case where the catalyst warm-up operation is performed when the parking lock mechanism is operated, a first catalyst warm-up operation is performed, while in a case where the catalyst warm-up operation is performed when the parking lock mechanism is not operated, a second catalyst warm-up operation is performed, wherein the rotational fluctuation of the internal combustion engine is larger when the second catalyst warm-up operation is performed than when the first catalyst warm-up operation is performed.

2. The vehicle control device according to claim 1, wherein:

the first catalyst warm-up operation is an operation performed by retarding an ignition timing of the internal combustion engine; and the second catalyst warm-up operation is an operation performed by setting the ignition timing to a later timing compared to the first warm-up operation.

* * * * *